Dec. 9, 1952  R. M. HENDERSON  2,620,662
WATER GAUGE SIGHT GLASS
Filed May 29, 1950

ROBERT M. HENDERSON
*INVENTOR.*

BY
*attorney*

Patented Dec. 9, 1952

2,620,662

UNITED STATES PATENT OFFICE 2,620,662

WATER GAUGE SIGHT GLASS

Robert M. Henderson, Bound Brook, N. J., assignor to Worthington Corporation, a corporation of Delaware Application May 29, 1950, Serial No. 165,094

3 Claims. (Cl. 73—323)

This invention relates to water gauge sight glasses whereby the quantity of water in an opaque enclosed tank may be readily determined, and more particularly to a water gauge sight glass particularly applicable for use on the water tanks of portable or transit concrete mixers.

An object of the present invention is to provide a strong, sturdy non-breakable water sight glass structure particularly adaptable for use on the water tanks of transit concrete mixers, which sight glass structure is simple in construction and inexpensive to manufacture.

With these and other objects in view, as may appear from the accompanying specification, the invention consists of various features of construction and combination of parts, which will be first described in connection with the accompanying drawings, showing a water gauge sight glass of a preferred form embodying the invention, and the features forming the invention will be specifically pointed out in the claims.

Figure 1:
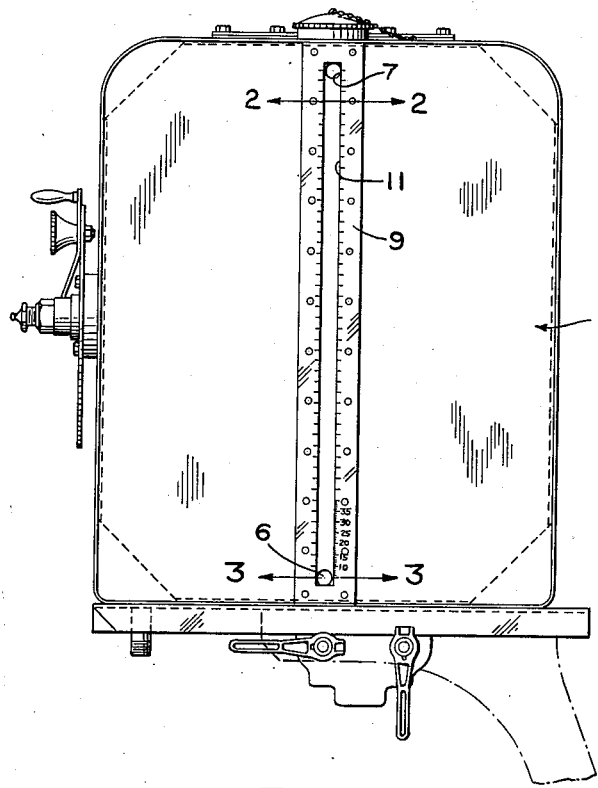
Figure 1 is an end elevation of a water tank of a transit concrete mixer showing the improved water gauge sight glass thereon.
Figure 2:
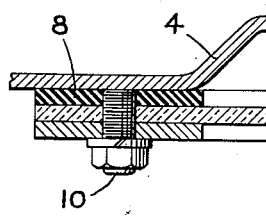
Figure 2 is a horizontal section taken on the line 2—2 of Figure 1.
Figure 3:
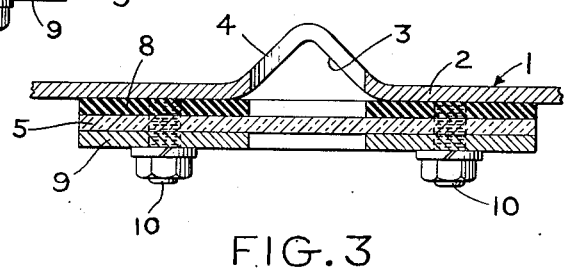
Figure 3 is a horizontal section taken on the line 3—3 of Figure 1.

Referring particularly to the drawings, the tank 1 is made of sheet metal in the usual construction and it has a portion of one wall 2 thereof struck or bent inwardly between the edges of the wall 2 as clearly shown in Figure 2 of the drawings to provide a channel 3, the inner side of which is closed and the outer side opens outwardly of the wall 2 of the tank 1. The indented portion 4 of the wall 2 which forms the walls of the channel 3 is provided with openings 6 and 7 extending therethrough near the top and the bottom of the tank 1 so as to permit water to enter the channel 3 through the opening 6 from the interior of the tank 1 and air to flow from the channel into the top of the tank and thus the water reaching its own level, the level of water in the tank will be correspondingly maintained in the channel 3. A transparent sight glass 5 is mounted over the outer open side of the channel 3 and is attached in fluid tight engagement to the wall 2 to prevent leakage of water from the channel by a gasket 8, scale plate 9 and suitable bolts 10. The scale plate 9 and the gasket 8 are provided with longitudinal openings as shown at 11 in Figure 1 of the drawings so that the level of the water or other liquid in the channel 3 will be visible through the transparent sight plate 5. The transparent plate 5 is preferably made of a thermosetting transparent plastic material of any suitable type which is non-breakable so as to prevent breakage thereof during the rough conditions which are met with in the operation of a transit concrete mixer.

The scale plate 9 is calibrated in unit increments of definite unit quantities of the water or liquid in the tank such as being calibrated in one gallon increments, five gallon increments or the like, so that by reading the level of the water in the channel 3 on the calibrations of the scale plate 9 the quantity of water in the tank 1 may be readily determined.

It will be understood that the invention is not to be limited to the specific construction or arrangement of parts shown, but that they may be widely modified within the invention defined by the claims.

What is claimed is:

1. In a water gauge sight glass, a combination with a tank, said tank having a portion of its wall struck inwardly to form a channel opening out on the outer side of the tank and extending substantially from the top to the bottom of the tank, said inwardly struck portion of said tank wall having openings therethrough near its top and bottom and opening into the tank to permit fluid to flow from the tank into the channel, and a non-breakable sight glass attached in fluid tight engagement to the tank wall at the sides and ends of the channel to enclose the channel.

2. In a water gauge sight glass, a combination with a tank, said tank having a portion of its wall struck inwardly to form a channel opening out on the outer side of the tank and extending substantially from the top to the bottom of the tank, said inwardly struck portion of said tank wall having openings therethrough near its top and bottom and opening into the tank to permit fluid to flow from the tank into the channel, a transparent sight glass over the outer side of said channel, a gasket between said sight glass and tank wall to form a fluid tight connection between the sight glass and tank, and a binding plate mounted over the face of said sight glass at its edges.

3. In a water gauge sight glass, a combination with a tank, said tank having a portion of its wall struck inwardly to form a channel opening out on the outer side of the tank and extending substantially from the top to the bottom of the tank, said inwardly struck portion of said tank wall having openings therethrough near its top and bottom and opening into the tank to permit fluid to flow from the tank into the channel, a transparent sight glass over the outer side of said channel, a gasket between said sight glass and tank wall to form a fluid tight connection between the sight glass and tank, and a binding plate mounted over the face of said sight glass at its edges, said binding plate being calibrated to indicate quantity units of liquid in the tank.

ROBERT M. HENDERSON.

REFERENCES CITED

The following references are of record in the file of this patent:

UNITED STATES PATENTS

| Number | Name | Date |
|---|---|---|
| 222,263 | Fitzgerald et al. | Dec. 2, 1879 |
| 268,186 | Cave | Nov. 28, 1882 |
| 406,176 | Mayer | July 2, 1889 |
| 1,347,398 | O'Rourke | July 20, 1920 |
| 1,377,577 | Hanson | May 10, 1921 |
| 1,784,973 | Preston | Dec. 16, 1930 |